(No Model.)
W. EIKENBARY.
DRAFT EQUALIZER.
No. 515,543. Patented Feb. 27, 1894.
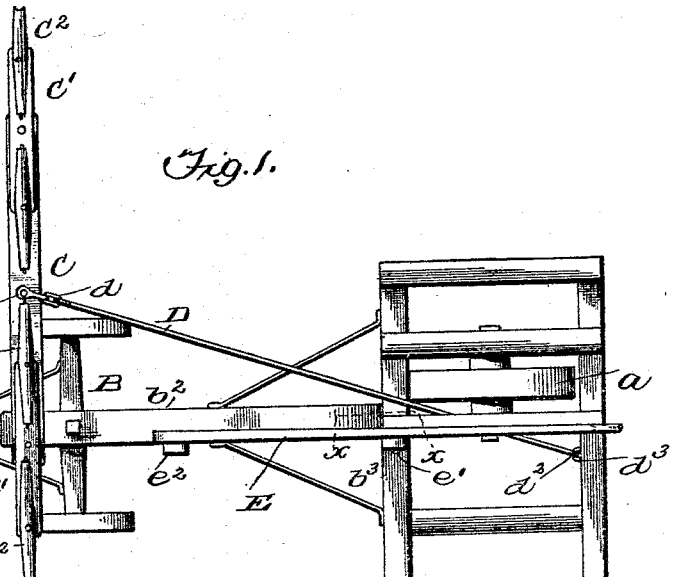
Fig. 1.
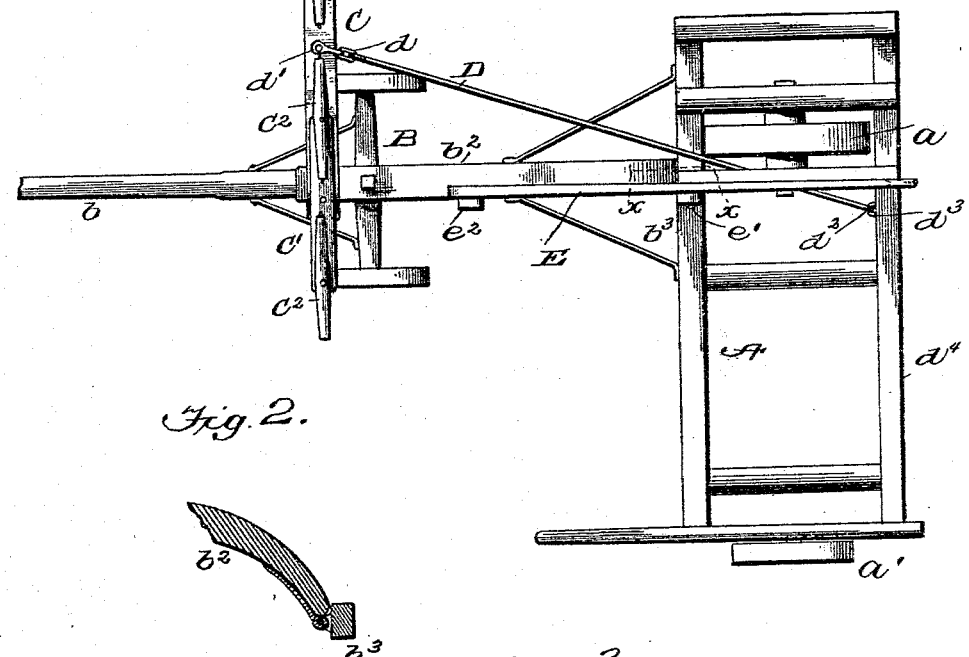
Fig. 2.
Fig. 3.
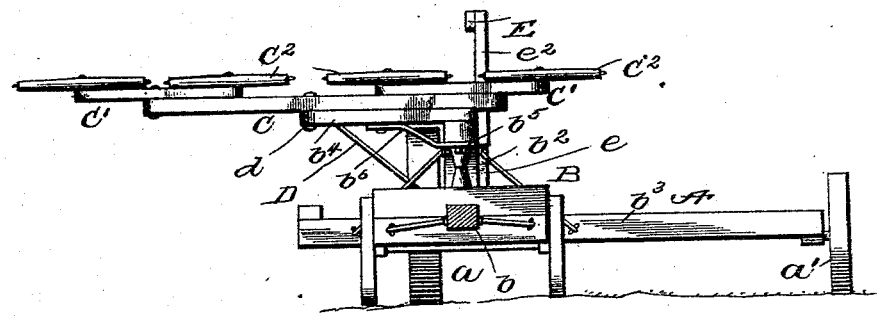
Witnesses
Inventor
William Eikenbary
By John Weddenburn
Attorney
THE NATIONAL LITHOGRAPHING COMPANY,
WASHINGTON, D. C.

UNITED STATES PATENT OFFICE.

WILLIAM EIKENBARY, OF UNION, NEBRASKA.

DRAFT-EQUALIZER.

SPECIFICATION forming part of Letters Patent No. 515,543, dated February 27, 1894.

Application filed June 18, 1892. Serial No. 437,171. (No model.)

*To all whom it may concern:*

Be it known that I, WILLIAM EIKENBARY, of Union, in the county of Cass and State of Nebraska, have invented certain new and useful Improvements in Draft-Equalizers for Self-Binders; and I do hereby declare the following to be a full, clear, and exact description of the invention, such as will enable others skilled in the art to which it appertains to make and use the same.

This invention contemplates certain new and useful improvements in draft attachments for self-binders, and has for its object the production of cheap, simple and highly efficient means for equalizing the draft and preventing all side draft of the machine and also for raising and lowering the platform.

The invention comprises a draft equalizer for self binders having a double-tree for the attachment of four horses abreast, and a connecting rod leading from the center of said double tree to and connected with the back of the machine.

The invention also comprises the detail construction, combination and arrangement of parts, substantially as hereinafter fully set forth and particularly pointed out in the claim.

In the accompanying drawings:—Figure 1 is a plan view showing my improvements. Fig. 2 is a vertical sectional view on the line $x-x$, Fig. 1. Fig. 3 is a front elevation.

Referring to the drawings, A designates the frame of a self binder, and $a, a'$, the carrying wheels thereof. The operating mechanism of the machine is not shown, since it forms no part of my invention.

B is a truck to which the tongue $b$ is secured, and to this truck is loosely connected at $b'$ the forward end of a short curved tongue $b^2$, which latter is pivotally connected at its rear end to the front bar $b^3$ of frame A. An arm $b^4$ is extended laterally from the outer end of short tongue $b^2$, the same being held by a pivot bolt $b^5$ which also engages a brace-plate $b^6$, attached at its outer end to the end of said arm $b^4$. Upon the outer end of arm $b^4$ is pivotally connected a double tree C, to the outer ends of which are pivotally secured whiffletrees C'. To their ends, in turn, are secured singletrees $C^2$ for connection of four horses abreast, three being on the right of tongue $b$ and one on the left thereof.

D is a rod attached by a link $d$ to the clip $d'$ at the center of doubletree C, said link engaging a hooked end of said rod. This rod is extended diagonally across frame A to one side of wheel $a$ to the back of frame A. Its rear hooked end $d^2$ engages an eye $d^3$ projecting from the rear cross-bar $d^4$ of frame A. By means of this rod all side draft of the machine is relieved.

E is a lever fulcrumed by an arm $e$ pivotally connected at $e'$ to frame A, and to its forward end is pivotally connected an arm $e^2$, likewise secured at its lower end to short tongue $b^2$. By means of this lever frame A can be raised and lowered.

The advantages of my invention are apparent to those skilled in the art to which it appertains. It will be specially observed that by means thereof an equalization of draft pressure is secured and that the truck to which the tongue is attached is so arranged that it works beneath the short tongue connected to the machine and a full square turn can be made without moving the machine.

I claim as my invention—

In a draft equalizer, the combination with a frame of a short curved tongue $b^2$, an arm $b^4$ extended laterally from the outer end of said short tongue and held by a pivot bolt at its inner end, a double-tree C pivotally mounted on the outer end of the arm $b^4$, and extending over the same and projecting from opposite sides thereof, whiffle-trees C' attached to the said double-tree which are provided with single-trees, three of the same being on one side of the tongue and one on the opposite side, a rod D attached by a link at its front end through the medium of a clip to the said double-tree the rear end of the said rod being extended diagonally across the frame to the back of the same where it is attached to relieve the said draft, a lever pivotally connected to the said frame, an arm $e^2$ pivotally connected to the said lever at one end and at its opposite end to the said short tongue, and a truck B which has a tongue $b$, said truck being loosely connected to the forward end of the said curved tongue, substantially as described.

In testimony whereof I have signed this specification in the presence of two subscribing witnesses.

WILLIAM EIKENBARY.

Witnesses:
   PETER CLARENCE,
   DANIEL W. FOSTER.